United States Patent
Brown et al.

(10) Patent No.: US 6,377,792 B1
(45) Date of Patent: Apr. 23, 2002

(54) METHOD AND APPARATUS FOR NETWORK-TO-USER VERIFICATION OF COMMUNICATION DEVICES BASED ON TIME

(75) Inventors: Daniel P. Brown, Elmhurst; Dean E. Thorson, Hoffman Estates, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/425,265

(22) Filed: Oct. 22, 1999

(51) Int. Cl.[7] .......................... H04M 1/66; H04B 15/00
(52) U.S. Cl. ..................... 455/411; 455/410; 455/502
(58) Field of Search ................. 455/410, 411, 455/38.3, 502, 414, 441, 503

(56) References Cited

U.S. PATENT DOCUMENTS

| | | | | |
|---|---|---|---|---|
| 4,903,327 A | * | 2/1990 | Raghuram et al. | 455/127 |
| 5,121,408 A | * | 6/1992 | Cai et al. | 455/161.1 |
| 5,164,923 A | * | 11/1992 | Avis | 368/4 |
| 5,235,270 A | * | 8/1993 | Shimada et al. | 324/121 R |
| 5,555,551 A | * | 9/1996 | Rudikas et al. | 455/411 |
| 5,862,482 A | * | 1/1999 | Beesley | 455/434 |
| 5,987,316 A | * | 11/1999 | Gordon et al. | 455/411 |
| 6,019,500 A | * | 2/2000 | Hasegawa et al. | 368/202 |
| 6,047,174 A | * | 4/2000 | Frederick | 455/410 |
| 6,094,572 A | * | 7/2000 | Sandre et al. | 455/411 |
| 6,167,482 A | * | 12/2000 | Schmidt et al. | 711/103 |

FOREIGN PATENT DOCUMENTS

JP  H03-019464  * 1/1991  .......... H04M/17/00

* cited by examiner

Primary Examiner—Vivian Chin
Assistant Examiner—Charles N. Appiah
(74) Attorney, Agent, or Firm—Sayed Hossein Beladi; Steven A. May

(57) ABSTRACT

A method and apparatus provides for a subscriber device (106) to signal changing from a first network to a second network including receiving via a transceiver (120) at the subscriber device (106) a time value from another network and generating from a clock (124) at the subscriber device (106) a current time value and then using a controller (126) deriving a delta time value between the time value and the current time value. The controller (126) signals the user when the delta time value between the time value and the current time value changes.

22 Claims, 3 Drawing Sheets

METHOD AND APPARATUS FOR NETWORK-TO-USER VERIFICATION OF COMMUNICATION DEVICES BASED ON TIME

FIELD OF THE INVENTION

The present invention relates generally to communication networks and, in particular, to network-subscriber device authentication.

BACKGROUND OF THE INVENTION

In a wireless communication network, subscriber devices are authenticated by the network to prevent non-registered and fraudulent subscriber devices from accessing the network. Methods of authentication or verification are currently implemented in wireless networks as either a one-way authentication or mutual authentication.

One-way authentication occurs when a subscriber device is initially powered-up or at periodic intervals while the subscriber device is powered on. Typically, the network will send an authentication request message containing a publicly-known key or code to the subscriber device. The subscriber device, upon receiving the authentication request message and publicly-known key derives an authentication response message. The authentication response message is sent back to the network and is processed by the network to determine if access will be granted. Thus, the authentication or verification only occurs in one direction (subscriber device-to-network). A problem with one-way authentication or verification, is that only the authenticating devices are protected from fraud. The non-authenticating device (i.e. base station) may be a ▒ false network device ▒ acquiring information from the authenticating subscriber device.

Mutual authentication or verification occurs when a subscriber device proceeds through authentication or verification as described above in addition to the network being authenticated or verified by the subscriber device. A method of mutual authentication is the direct challenge with response confirmation method. Either the network side or subscriber side may selectively challenge (authenticate) the other at any time. In an alternate approach, every message has authentication information transferred between the network and subscriber device. A problem with the mutual authentication of each message and the direct challenge approach is that the bandwidth overhead proves to be costly and inefficient.

As an example of the potential security threat, a base site will typically be employed as a transmission link to enable a subscriber device to both send and receive data packets with a packet data network. A simple method of verifying the base site to the subscriber device may consist of integrating a time-varying password with the data packets that are sent to the subscriber device. In this manner there is no need for the separate transmission of a challenge from the subscriber device to the base site, since both units maintain a common perception of time. This method is commonly used for access to data servers, and is marketed by SECURITY DYNAMICS™ as the "Ace" card.

However, in some applications, the base site is also responsible for the maintenance of "time" as perceived by the subscriber device. Therefore a false base site could replay previous verification responses to the subscriber device if the false base can modify the subscriber device's perception of time.

Thus, a need exists in the art for a method and apparatus for protecting subscriber devices in a wireless communication network against ▒ false base site ▒ that are able to gain access to subscriber information.

DETAILED DESCRIPTION OF THE PREFERRED EMBODIMENTS

Figure 1:
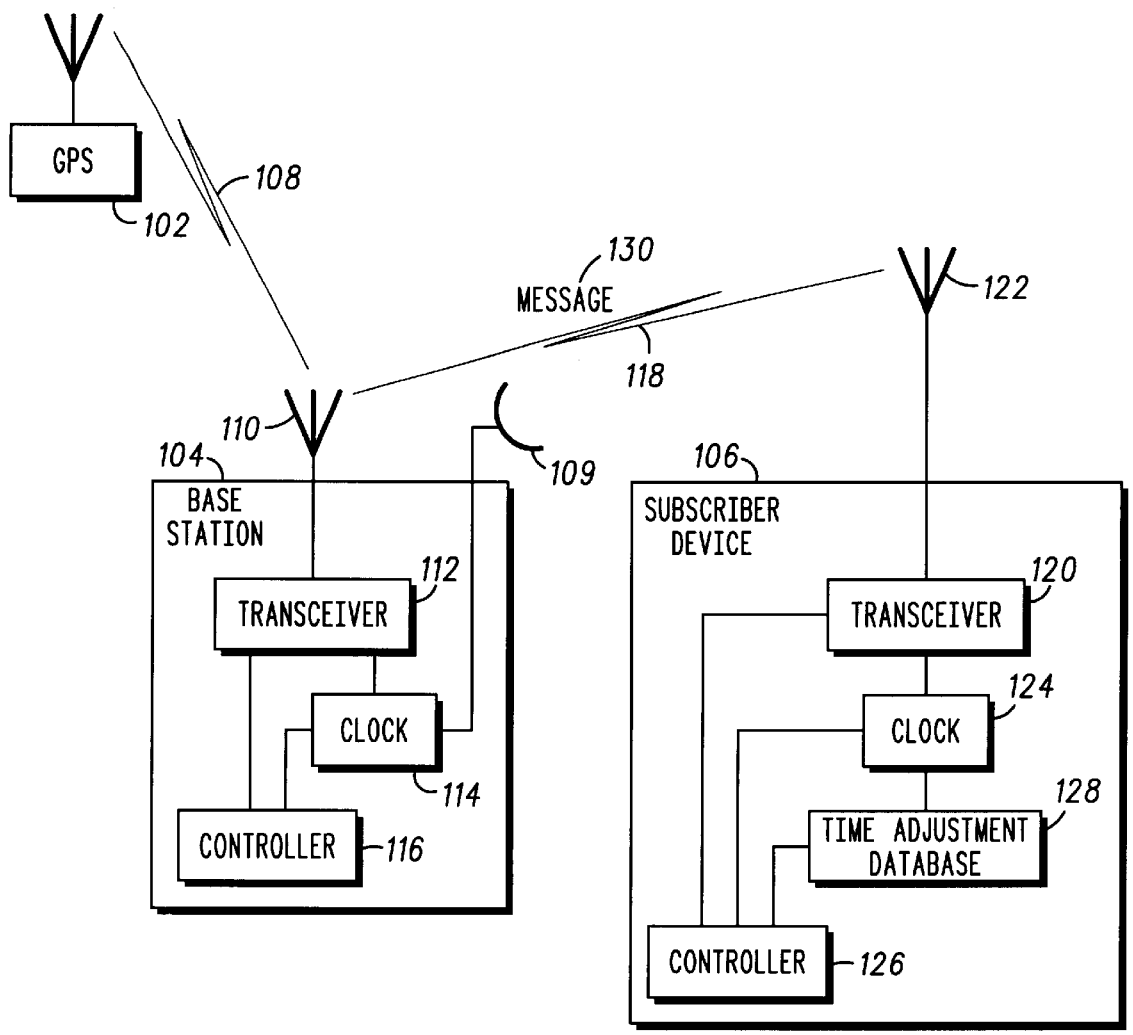
FIG. 1 is an illustration of a communication system receiving timing from a global positioning satellite in accordance with an embodiment of the invention.

In FIG. 1, a communication system having a global positioning satellite (GPS) 102, a cellular base station 104, and a subscriber device 106 is shown. The GPS 102 supplies a timing or clock signal 108 to the network entities, such as the base station 104, enabling the network entities (in a first network) to synchronize clocking to a common timing source.

The base station 104 has an antenna 110 coupled to a transceiver 112. The transceiver 112 being a transmitter and a receiver for transmitting and receiving signals. The transceiver 112 is coupled to the antenna 110, a clock 114, and a controller 116. The clock 114 is also connected to a GPS antenna 109 for receiving the clock signal 108 from the GPS satellite 102. The controller 116 manages the clock 114 and sets system dates and times. The base station 104 also sends and receives communications over a wireless communication path 118 with a subscriber device 106.

The subscriber device 106 has another transceiver 120 coupled to another antenna 122, another clock 124, and another controller 126. The other controller 126 is coupled to the other transceiver 120, the other clock 124, and a time adjustment database 128 contained in a memory. The subscriber device may be powered by a battery or coupled to an alternating current (AC) power supply.

The subscriber device 106 receives a time adjustment message 130 at the other transceiver 120 via the other antenna 122 from the base station 104 over the wireless communication path 118. The other controller 126 processes the time adjustment message 130 and, as will be discussed below, determines if the base station 104 will be accessed and the other clock 124 updated. If a difference in time between the subscriber device and network exist, then the base station potentially is in another network (i.e. a potential fraudulent base station).

The other clock 124 used in the subscriber device is selected because of its characteristics. The clock is often incorporated into custom hardware developed for the subscriber device and is required to be sensitive to the accuracy of the frequency reference used for the calculation of time. Additionally, reasonably priced oscillators can be purchased for hardware designs that have +/−15 part-per-million accuracy. An example of a crystal component that can support this operation is the CONNER-WINFIELD XM-1™ series crystals. The tolerance of +/−15 PPM can provide fraud protection (assuming a 4 second tolerance window) for more than 37 hours after disconnection from a network in the present embodiment of the invention, assuming that a natural reference slip cannot exceed half of the tolerance window (2 seconds).

In the present embodiment, the system is a Code Division Multiple Access (CDMA) cellular system as described in Cellular System Remote Unit-Base Station Compatibility Standard of the Electronic Industry Association/ Telecommunications Industry Association Interim Standard 95 (TIA/EIA/IS-95A), which is incorporated by reference herein. (EIA/TIA can be contacted at 2500 Wilson Blvd, Suite 300, Arlington, Va. 22201). "Personal Station-Base Station Compatibility Requirements for 1.8 to 2.0 GHz Code Division Multiple Access (CDMA) Personal Communication Systems" (American National Standards Institute (ANSI) J-STD-008), but in alternate embodiments communication system may utilize other analog or digital cellular communication system protocols such as, but not limited to, the Narrowband Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol.

The IS-95 CDMA specification describes the time adjustment procedure for a cellular communication system. The system time information is broadcast on a specific channel (Sync Channel) on the forward link. The time contained in the broadcast message is system time in 80 millisecond units, valid "as of four Sync Channel superframes (320 ms) after the end of the last superframe containing any part of the Sync Channel Message, minus the pilot PN sequence offset." The Sync Channel superframe is defined as three Pilot PN sequence periods, each of which is 32768/122880 seconds (26⅔ milliseconds) in length. The Sync message always begins on the first slot of the superframe, so the mobile station knows when the next superframe begins. The subscriber device has a perception of time based on the Sync Channel Messages (e.g. time adjustment messages). If the Sync Channel Message contains a false time, while maintaining all other aspects of the IS-95 channel intact the subscriber device acquires a false time.

Figure 2:
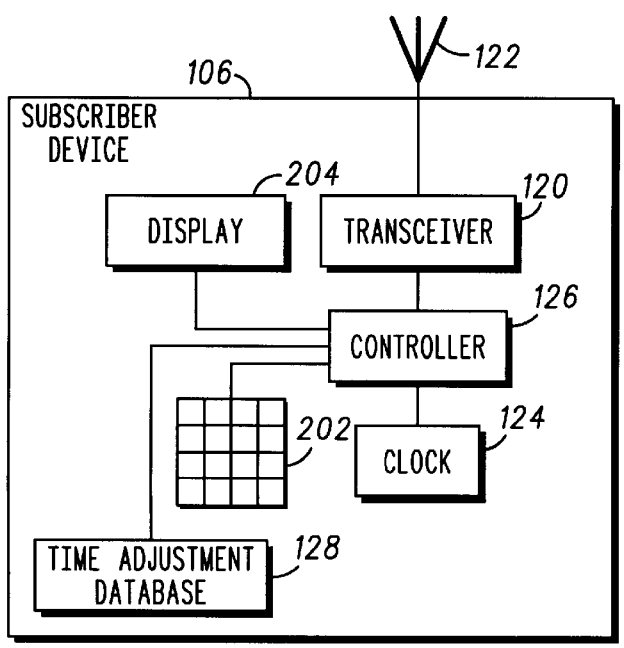
FIG. 2 is a block diagram of a subscriber device in accordance with an embodiment of the invention.

Turning to FIG. 2, a block diagram of the subscriber device 106 is shown. The subscriber device has the other transceiver 120 coupled to the other antenna 122, and the other controller 126. The other controller 126 is coupled to the other transceiver 120, a display 204, a keypad 202, the other clock 124, and the time adjustment database 128.

The other transceiver 120 receives the timing message 130, FIG. 1, from a base station 104 via the wireless communication path 118 and the other antenna 122, FIG. 2. The other controller 126 identifies the type of message as a timing message 130 requiring the time setting of the other clock 124 to be changed. The other controller 126 determines a delta time value between the time setting (a current or first time value) of the other clock 124, FIG. 2, and the time setting (a second time value) received in the timing message 130, FIG. 1. The other controller 126 then checks if the delta time value is below a threshold (e.g. 4 seconds) and, if so, then checks a memory (e.g. RAM, ROM, SDRAM) having the time adjustment database 128. The other controller 126 places the delta time value in the time adjustment database and verifies that for a predetermined amount of time the combined delta time value adjustments are below the time threshold value. The check of the delta time value adjustments over a predetermined period prevent a fraudulent base station from sending multiple small time adjustments over a short period in an attempt to avoid a single detectable time change. If the combined delta time value is below the time threshold value, then the time of the other clock 124 is updated.

If the time threshold value is exceeded by either the delta time value or the combined delta time values over a predetermined period, then an alert signal is activated. The alert signal is sent from the other controller 126 to the display 204 (a signal device) resulting in a visual alert. In alternative embodiments, an individual or combination of signal devices, visual (e.g. a display or light emitting diode for a visual alert signal), audio (e.g. a speaker for an audio alert signal), or mechanical (e.g. vibration), may selectively be used. The alert signals to a user that accessing the potential fraudulent base station is a security risk. The user responds to the alert and either proceeds with accessing the base station 104 or ceases communication with base station 104. The response to the alert in the present embodiment requires the user to enter a key on the key pad 202, FIG. 2. In the current embodiment, a ▓1▓ key is entered to proceed or a ▓2▓ key is entered by a user to cease accessing the base station 104, FIG. 1.

Figure 3:
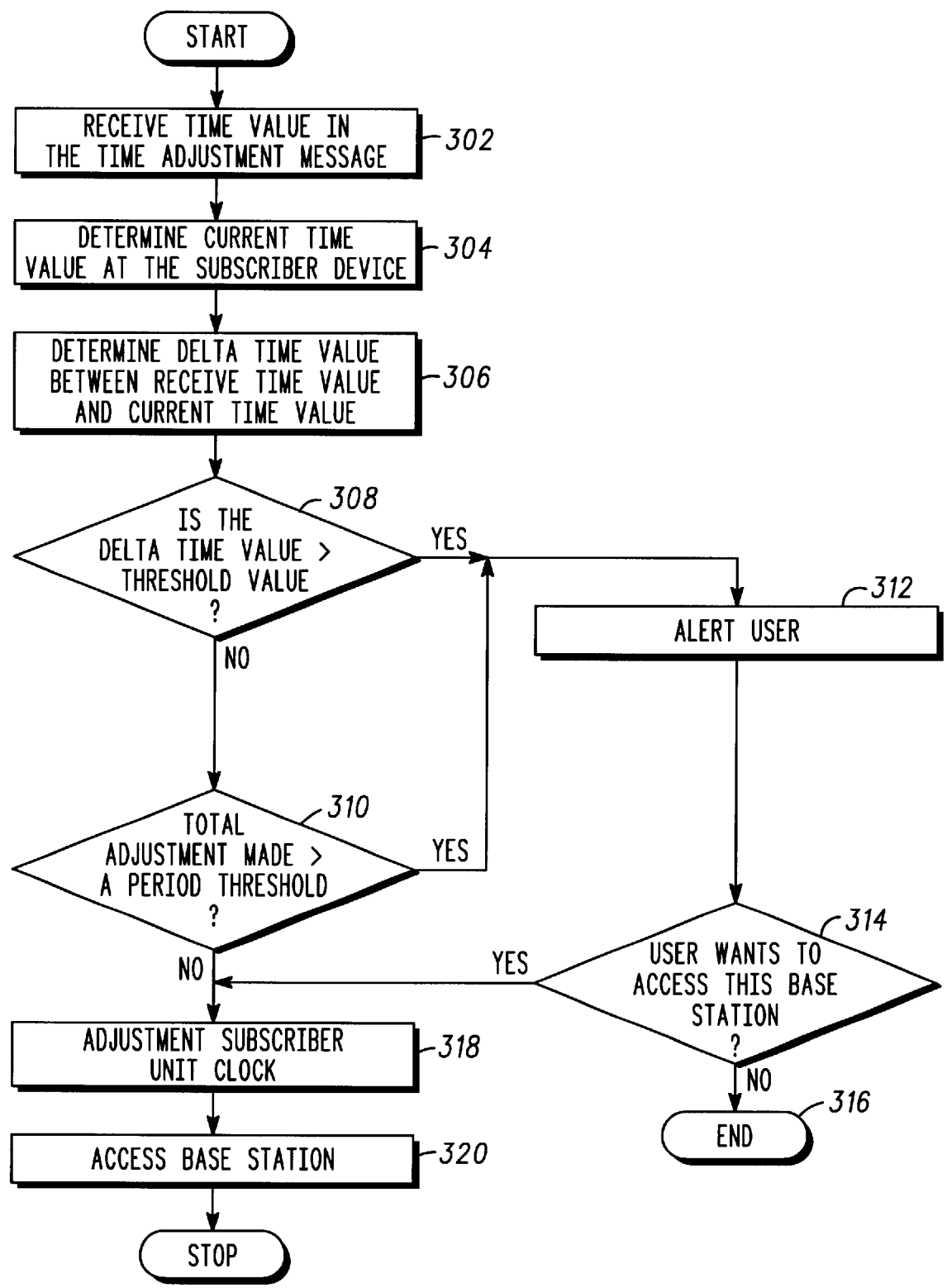
FIG. 3 is a flow chart illustrating a method of network device verification at a subscriber device in accordance with an embodiment of the invention.

In FIG. 3, a flow chart illustrating a method for network-to-user verification at a subscriber device based on time is shown. In step 302, a time adjustment message 130, FIG. 1, is received at the subscriber device 106, FIG. 2. The current time value maintained by the subscriber device is determined in step 304, FIG. 3. The controller 126, FIG. 2, determines the current time value from the other clock 124. In step 306, FIG. 3, the delta time value is determined between the time value from the clock 124, FIG. 2, and the received time value from the time adjustment message. An example of determination of the delta time value is the time value from the clock 124, FIG. 2, being subtracted from the received time value from the time adjustment message.

The delta time value is checked against a time threshold value, in step 308. If the delta time value is less than the time threshold value, then a second check to determine the total time change within a predetermined period occurs in step 310. If the total amount of time change is less than or equal to the period threshold value, then the clock in the subscriber device is adjusted, step 318, and the base station is accessed in step 320. Additionally, if, in step 310, the total time adjustments is greater than the period threshold value, then the period threshold value is met and the alert is activated in step 312.

If, in step 308, the time threshold value is met (time threshold value exceeded by the delta time value), then an alert is generated by the controller 126, FIG. 2, in step 312, FIG. 3. The user is prompted in step 314 to verify that the clock should be updated and base station accessed or if the accessing of the base station should be terminated. If the base station is to be accessed, then the clock in the subscriber device is adjusted in step 318 and the base site accessed, step 320. Otherwise, the base station is not to be access and, in step 316, the processing is complete.

Figure 4:
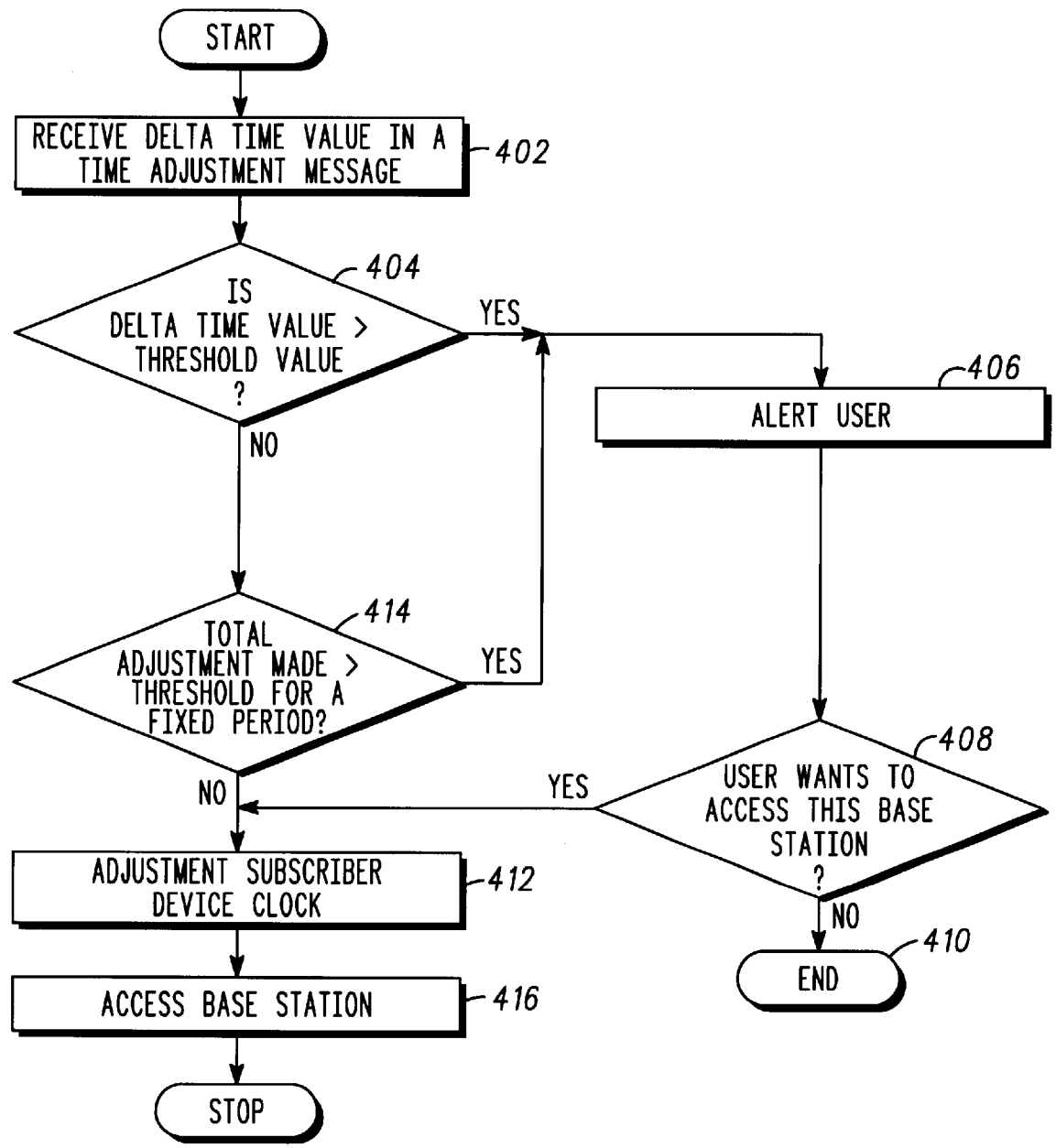
FIG. 4 is a flow chart illustrating an alternate method of subscriber device verification in accordance with an embodiment of the invention.

Turning to FIG. 4, a flow chart of an alternate method of authenticating a base station at a subscriber device is illustrated. The subscriber device 106, FIG. 1, receives a delta time value that represents the amount of time to advance or retard the clock from a base station 104 in step 402, FIG. 4. The time adjustment message 130, FIG. 1, received at the base station 104 being either an advance clock message or retard clock message. In step 404, the received delta time value is compared to a threshold time value. In the current embodiment, the threshold is set to a predetermined value, such as 5 seconds. But, in an alternate embodiment an average time value of delta time changes over a longer period may selectively be used.

If the delta time value is greater than the threshold value in step 406, then the threshold value has been met and an alert is activated in step 406. The alert can be visual using the display 204, FIG. 2, audio, or mechanical. The user responds to the alert. either by choosing to access the base station or to not access the base station by entering a key on the keypad 202. If in step 408, FIG. 4, the user response is to access the base station, then the clock 124, FIG. 2, is adjusted in step 412, FIG. 4, and the base site is accessed in step 416. Otherwise the base station 104, FIG. 1, is not accessed and the processing ceases in step 410, FIG. 4.

If the received delta time is less than or equal to the threshold in step 404, then a check of the total amount of time adjustment within a predetermined time period occurs. If the total amount of time adjustment is greater than the time threshold value in step 414, then the time threshold value is met and the alert is activated in step 406. Otherwise, the total time adjustment is less than the threshold for a fixed period of time and results in the clock 124, FIG. 2, in the subscriber device being adjusted, step 412, FIG. 4, and the base station accessed in step 416.

Thus, an embodiment of a method and apparatus for protecting subscriber devices in a wireless communication network against fraudulent base stations has been described. The change in timing between the fraudulent base station and a non-fraudulent base station is detectable by the subscriber device and the user is alerted to the timing change. Additionally, no increase in bandwidth is required to detected fraudulent base stations because the detection of timing changes at a subscriber device does not require additional messages between the base stations and the subscriber device.

While the invention has been particularly shown and described with reference to a particular embodiment, it will be understood by those skilled in the art that various changes in form and details may be made therein without departing from the spirit and scope of the invention and it is intended that all such changes come within the scope of the following claims.

What is claimed is:

1. A telephonic device comprising:
   a receiver for receiving a plurality of time values to produce a plurality of received time values;
   a clock for generating a plurality of time values to produce a plurality of generated time values;
   a controller coupled to a memory and the clock for comparing each received time value of the plurality of received time values to a corresponding generated time value of the plurality of generated time values to produce a plurality of delta time values, determining a combined delta time value based on the plurality of delta time values, and comparing the combined delta time value to a threshold, and wherein the telephonic device stores the plurality of delta time values in the memory; and
   a signal device coupled to the controller for signaling when the combined delta time value meets the threshold.

2. The telephonic apparatus of claim 1 in which the memory is coupled to the receiver.

3. The telephonic apparatus of claim 1 in which the signal device further comprises a display for a visual alert signal.

4. The telephonic apparatus of claim 1 in which the signal device further comprises a speaker for an audio alert signal.

5. The telephonic apparatus of claim 1 in which the first time value is received from a cellular base station.

6. The telephonic apparatus of claim 5 in which the cellular base station is a Code Division Multiple Access base station.

7. A method for identifying a change by a subscriber device from a first network to another network, the method comprising the steps of:
   generating at the subscriber device a first time value;
   receiving at the subscriber device a second time value from the other network;
   determining a delta time value between the first time value and the second time value; and
   signaling when the delta time value between the first time value and the second time value changes, thereby identifying the change by the subscriber device from the first network to the other network.

8. The method of claim 7 including the step of identifying the change by comparing the delta time value to a time threshold value.

9. The method of claim 8 further comprising the steps of:
   generating an alert signal if the time threshold value is met, and
   receiving a user input that indicates to the subscriber device to cease communication with the base station.

10. The method of claim 7 wherein the step of signaling comprises the step of displaying a visual alert at the subscriber device.

11. The method of claim 10 wherein the step of displaying comprises the step of writing to a display.

12. The method of claim 7 wherein the step of signaling comprises the step of sounding an audio alert at the subscriber device.

13. The method of claim 7 wherein the first network is a cellular communication network.

14. A method for determining if a base station is potentially fraudulent within a communication system, the method comprising the steps of:
   receiving a time adjustment message from the base station;
   determining if a time threshold is met based on the time adjustment message; and
   identifying the base station as being potentially fraudulent based on the determining step.

15. The method of claim 14 including the step of ceasing communication with the base station when the time threshold is met.

16. The method of claim 15 wherein the step of ceasing communication with the base station comprises the steps of:
   signaling when the base station has been identified as potentially fraudulent, and
   receiving a user input that indicates to cease communication with the base station identified as potentially fraudulent.

17. The method of claim 14 wherein the step of receiving the time adjustment message comprises the step of receiving an advance clock message.

18. The method of claim 17 wherein the step of determining if the time threshold is met comprises the steps of checking if the time threshold is met by a delta time value contained in the advance clock message.

19. The method of claim 14 wherein the step of receiving the time adjustment message comprises the step of receiving a retard clock message.

20. The method of claim 19 wherein the step of determining if the time threshold is met comprises the steps of checking if the time threshold is met by a delta time value contained in the retard clock message.

21. The method of claim 20 wherein the step of determining the threshold comprises the steps of determining a current time value of the clock,
   comparing the current time value to the second time value, and
   determining if the time threshold is met based on the comparison.

22. The method of claim 14 wherein the step of receiving the time adjustment message comprises the step of receiving a message to update a clock to a second time value.

* * * * *